June 18, 1968  R. D. PRICE  3,388,685
APPARATUS FOR GREASING BAKING PANS
Filed June 9, 1964  6 Sheets-Sheet 1

INVENTOR
Richard D. Price
BY
*Synnestvedt + Lechner*
ATTORNEYS

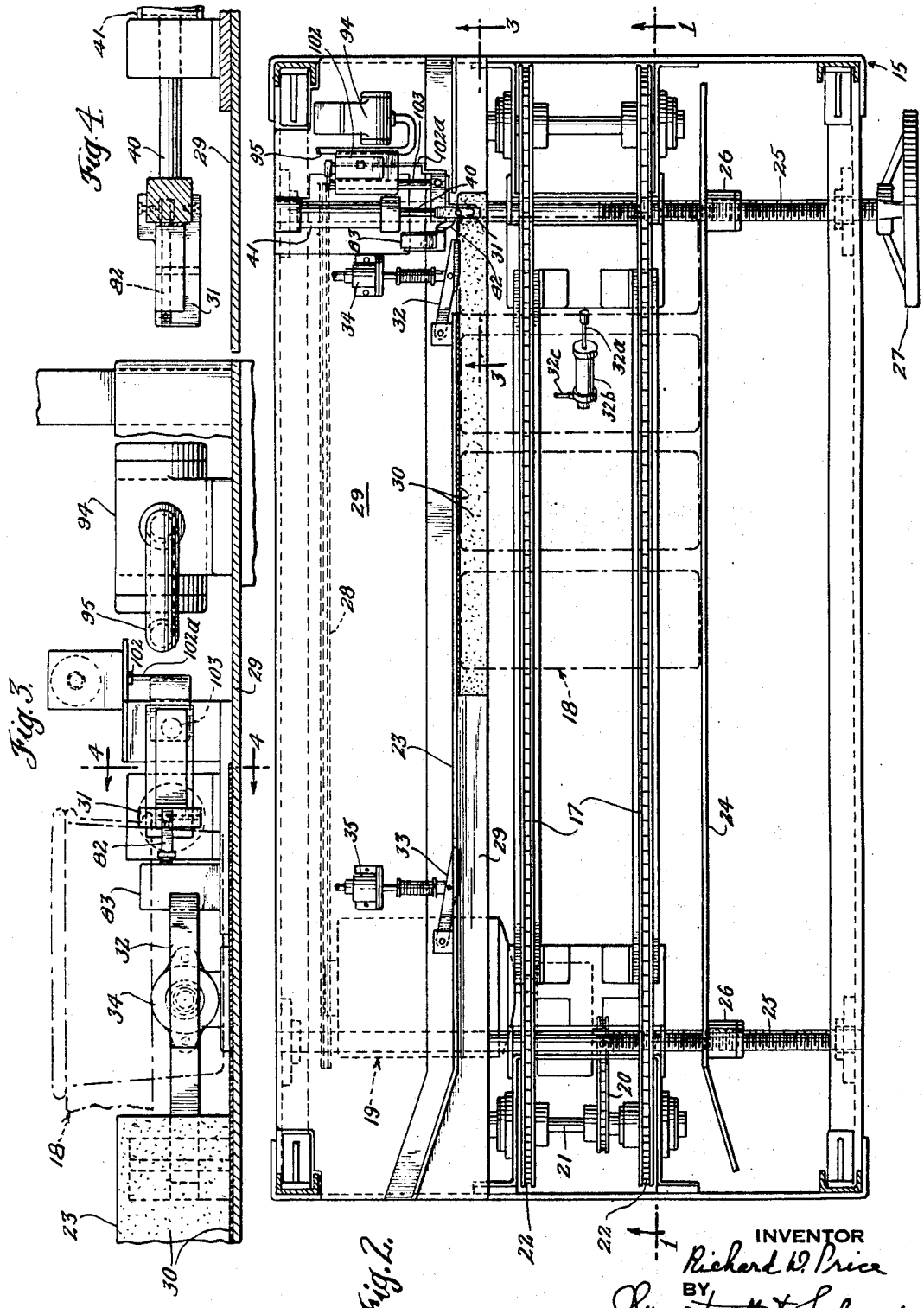

June 18, 1968 R. D. PRICE 3,388,685
APPARATUS FOR GREASING BAKING PANS
Filed June 9, 1964 6 Sheets-Sheet 3

INVENTOR
Richard D. Price
BY
Synnestvedt & Lechner
ATTORNEYS

June 18, 1968  R. D. PRICE  3,388,685
APPARATUS FOR GREASING BAKING PANS
Filed June 9, 1964  6 Sheets-Sheet 4
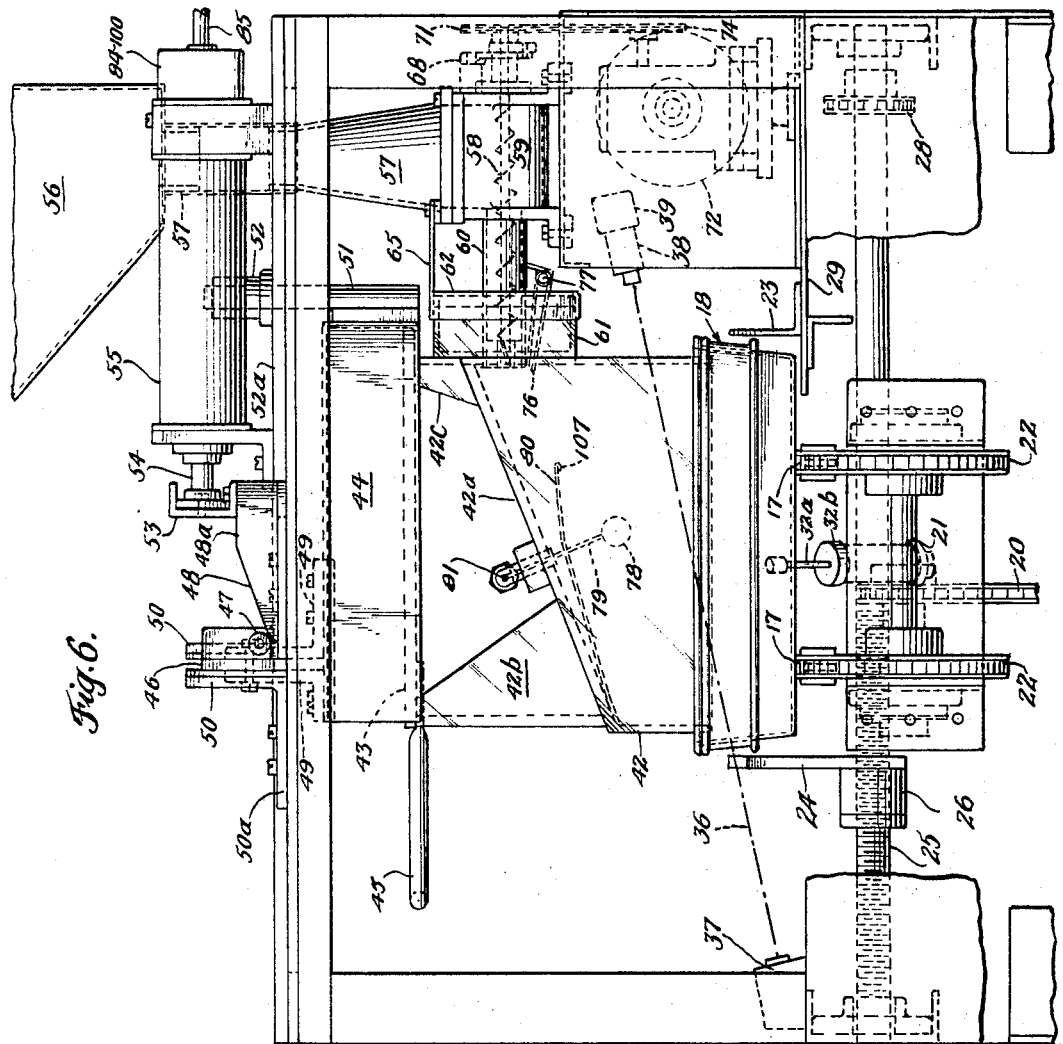
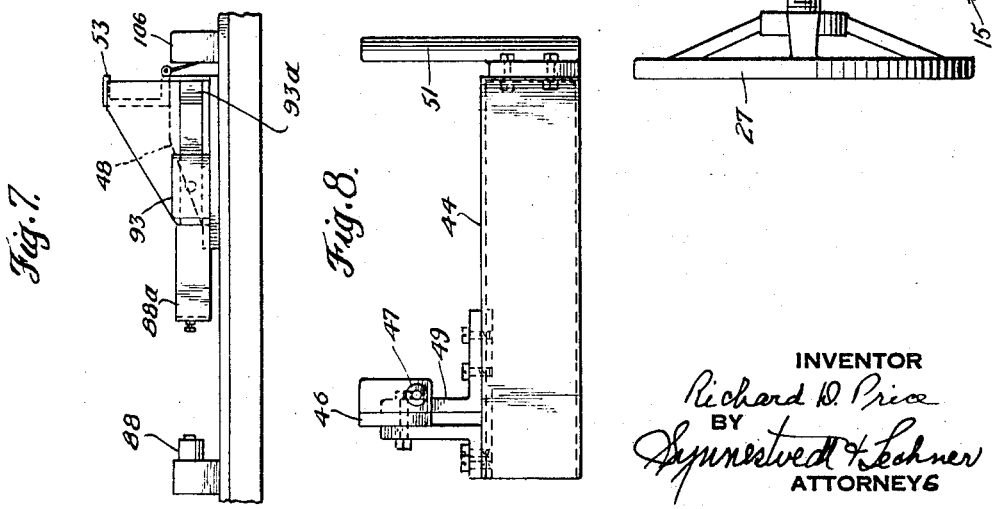
INVENTOR
Richard D. Price
BY
Synnestvedt & Lechner
ATTORNEYS June 18, 1968
R. D. PRICE
3,388,685
APPARATUS FOR GREASING BAKING PANS
Filed June 9, 1964
6 Sheets-Sheet 5
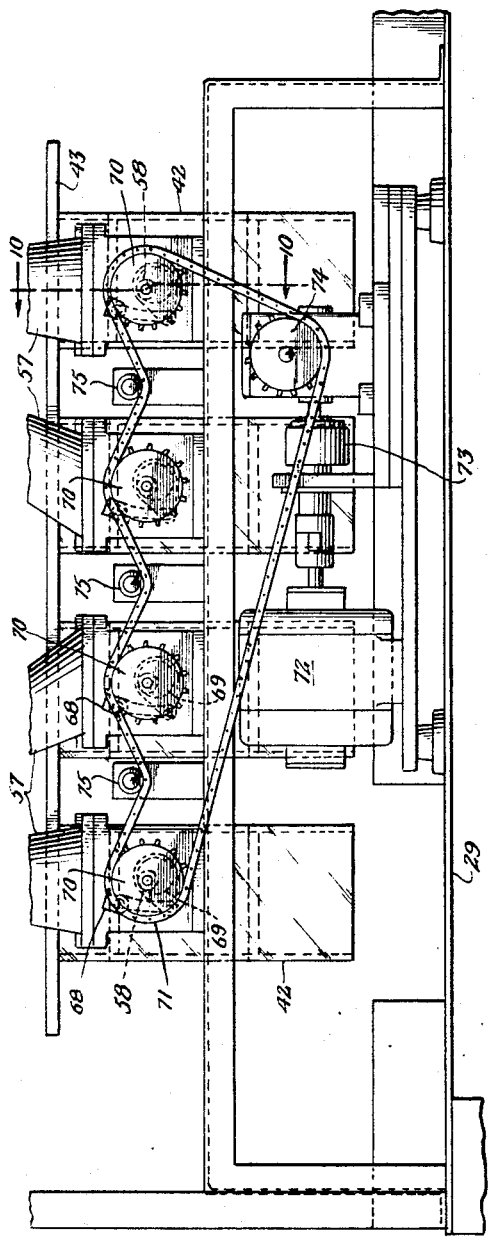
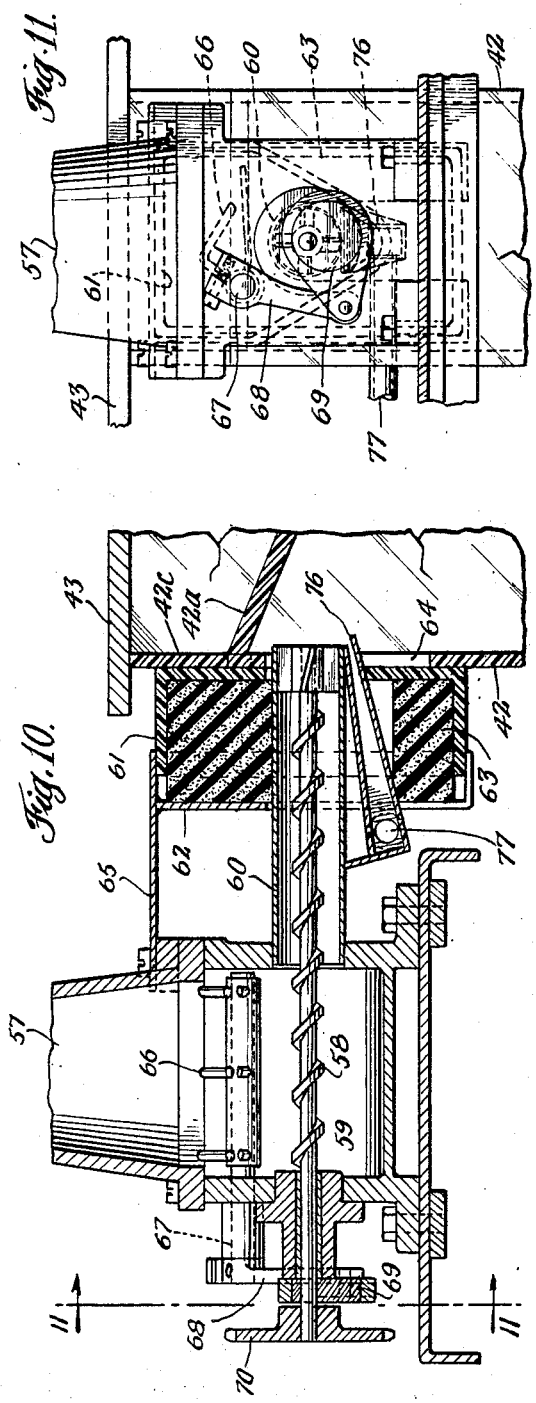
INVENTOR
Richard D. Price
BY
Synnestvedt & Lechner
ATTORNEYS June 18, 1968  R. D. PRICE  3,388,685
APPARATUS FOR GREASING BAKING PANS
Filed June 9, 1964  6 Sheets-Sheet 6
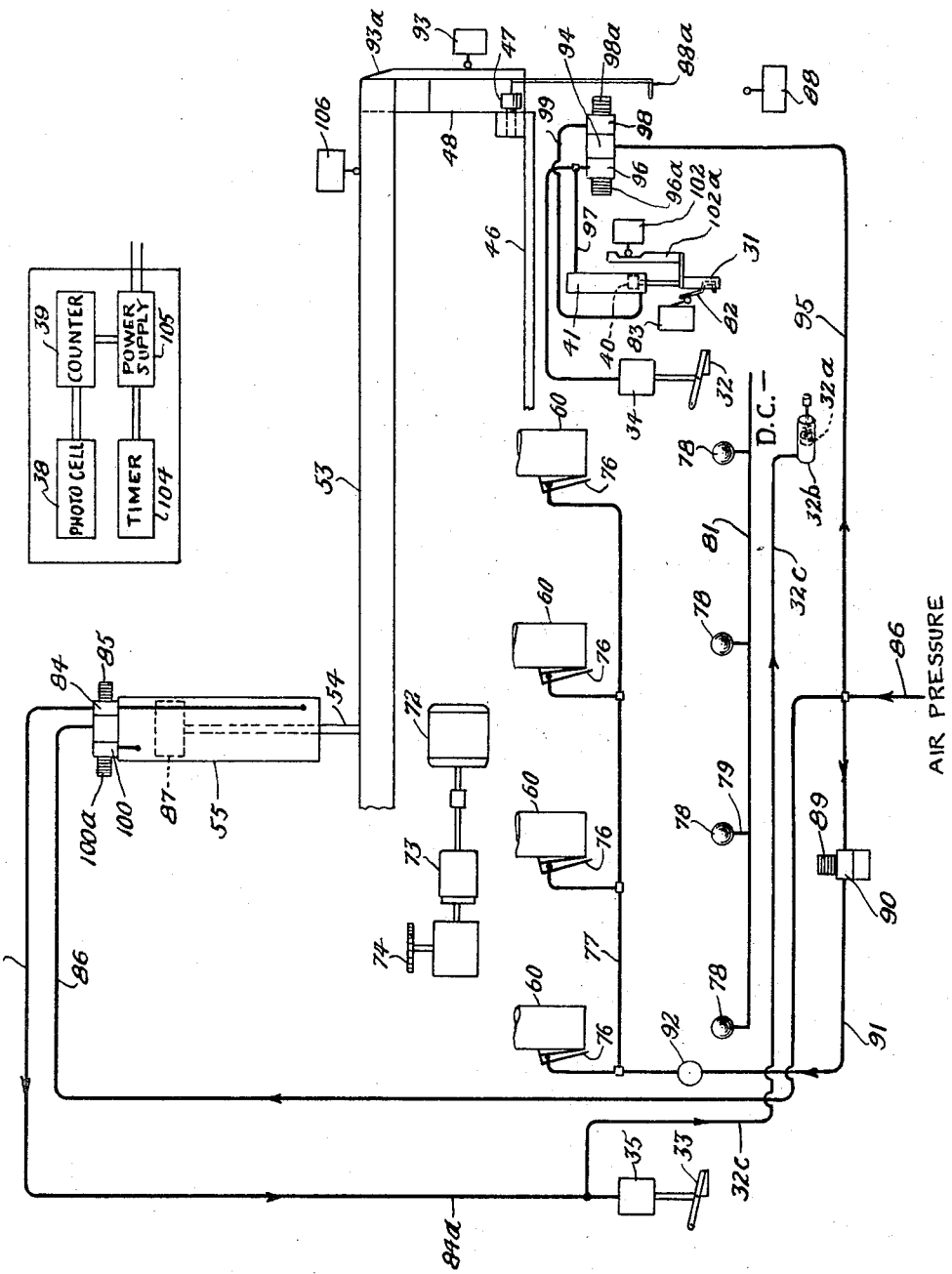
INVENTOR
Richard D. Price
BY
Synnestvedt & Lechner
ATTORNEYS United States Patent Office 3,388,685
Patented June 18, 1968

3,388,685
APPARATUS FOR GREASING BAKING PANS
Richard D. Price, Green Lane, Pa., assignor to Hascolube Research & Manufacturing Corp., Philadelphia, Pa., a corporation of Pennsylvania
Filed June 9, 1964, Ser. No. 373,737
12 Claims. (Cl. 118—2)

ABSTRACT OF THE DISCLOSURE

Apparatus for applying a lubricant or depanning agent in powdered form to the interior of baking pans, including a nonconductive hood configured to enter the top of the pan, powdered lubricant supply means, means for developing a cloud of the powder within the hood, electrostatic means for directing the powder to the surface of the pan, and mechanism providing for separation of the hood from the pan after the powder supply has been terminated.

---

This invention relates to the art of greasing pans such, for example, as are used in the baking of bread so that, when the baking is completed, the finished loaves may be readily removed from the pans. This is sometimes referred to as the "depanning" operation.

In order to fully understand and appreciate the nature of the present invention a brief word should be said about the pan greasing procedures presently familiar to the art. The most common scheme, of course, is to apply a liquid grease to the inside of the pan and this has been accomplished by nozzles of one kind or another with relatively high air pressures for carrying the grease through the nozzles and discharging it into the pans. The combination of nozzles and pressure is intended to suitably atomize or finely divide the liquid grease in an effort to apply the minimum quantity possible while still adequately coating the interior surfaces of the pans. In some devices compressed air and nozzles are replaced by a spinning disk-like member which throws the grease with sufficient velocity to approximate atomization while at the same time avoiding the problems which are incident to clogging of the fine openings in the nozzles.

All of the schemes referred to present certain difficulties not the least of which is the problem of what is known as "overspray," that is, the throwing of grease over the edges of the pans. Such "overspray" coats the exterior walls of the pans and results in the build-up of troublesome layers of carbonized material from the heat of the ovens so that the pans require frequent cleaning. This is time consuming as well as costly.

My invention is directed to the provision of a pan greasing machine which avoids the difficulties mentioned as well as others which are incident to prior art practices, by introducing the lubricant into the pans in such a way as to positively confine it to the interior walls of the pans and thereby prevent "overspray."

A concomitant object and one which flows from the substantially complete confinement of the grease to the interior walls of the pans is to provide a machine which can be much more easily kept in a clean and sanitary condition by virtue of the fact that none of the grease is permitted to escape the pans and fall down on the outside.

Another object of the invention is to provide means whereby the amount of grease introduced into the pans is reduced to the absolute minimum required for adequate depanning of the bread whereby to save material, reduce costs and, incidentally, improve the quality and flavor of the bread, which quality and flavor, heretofore, have sometimes been somewhat impaired by virtue of the fact that the customary greasing techniques have generally applied much more grease than is actually needed for the baking and depanning operations. My invention also contemplates the avoidance of the presence of excess grease on the floor or bottom of the pan which, heretofore, has sometimes been a problem where the grease runs down the inside walls of the pans and accumulates on the floor.

Still another object of the invention is to provide a means for greasing pans which eliminates the need for employing high air pressures and/or high grease velocities in delivering the grease to the pans.

A further object of the invention is to provide means for electrostatically aiding in the distribution of the grease directly to and over the entire interior surfaces of the pans in such a way as to insure thorough coverage while at the same time preventing the grease from reaching the exterior walls of the pans.

Another important object is to provide pan greasing equipment by means of which the grease may be applied to the interior pan surfaces in the form of a dust or powder whereby certain advantages to be hereinafter more fully explained can be secured.

A still further object of the invention is to provide for the application of a grease in the form of powder or dust to the walls of the pan while the pan is in heated condition—in fact, at a temperature which is higher than the melting temperature of the powdered grease so that when the dust hits the walls of the pans it melts and spreads by capillary action to form the desired coating. Then, when the pans cool to a temperature below the solidifying point, the grease will harden and remain in situ until such time as the pans are required for a baking operation. In this way large numbers of pans can be prepared and stacked ready for use at a time when the bakery is handling peak loads so that my invention makes possible a more efficient utilization of the productive capacity of a bakery thereby increasing its output potential.

Other objects and advantages of the invention will appear in connection with the following description of the accompanying drawings, wherein:

FIGURE 2 is a plan section on a larger scale taken on the line 2—2 of FIGURE 1 with the pans shown in dot and dash lines in the positions they occupy when the grease is being applied;

FIGURE 3 is a still further enlarged view taken as indicated by the line 3—3 of FIGURE 2;

FIGURE 4 is a cross section on the line 4—4 of FIGURE 3;

FIGURE 6 is an enlarged elevational view looking toward the left in FIGURE 1 but with certain switch parts omitted in order to avoid confusion;

FIGURE 7 is a fragmentary end elevation illustrating certain switching mechanisms used in controlling the operation of the machine;

FIGURE 8 is an enlarged fragmentary view showing certain details of the machine;

FIGURE 9 is a rear elevational view of the upper portion of the machine showing certain other details of the mechanism;

FIGURE 10 is an enlarged cross section of the mechanism for feeding the lubricant taken as indicated by the line 10—10 on FIGURE 9;

FIGURE 11 is a cross section taken on the line 11—11 of FIGURE 10; and

FIGURE 12 is a diagram of the controlling mechanism.

Figure 1:
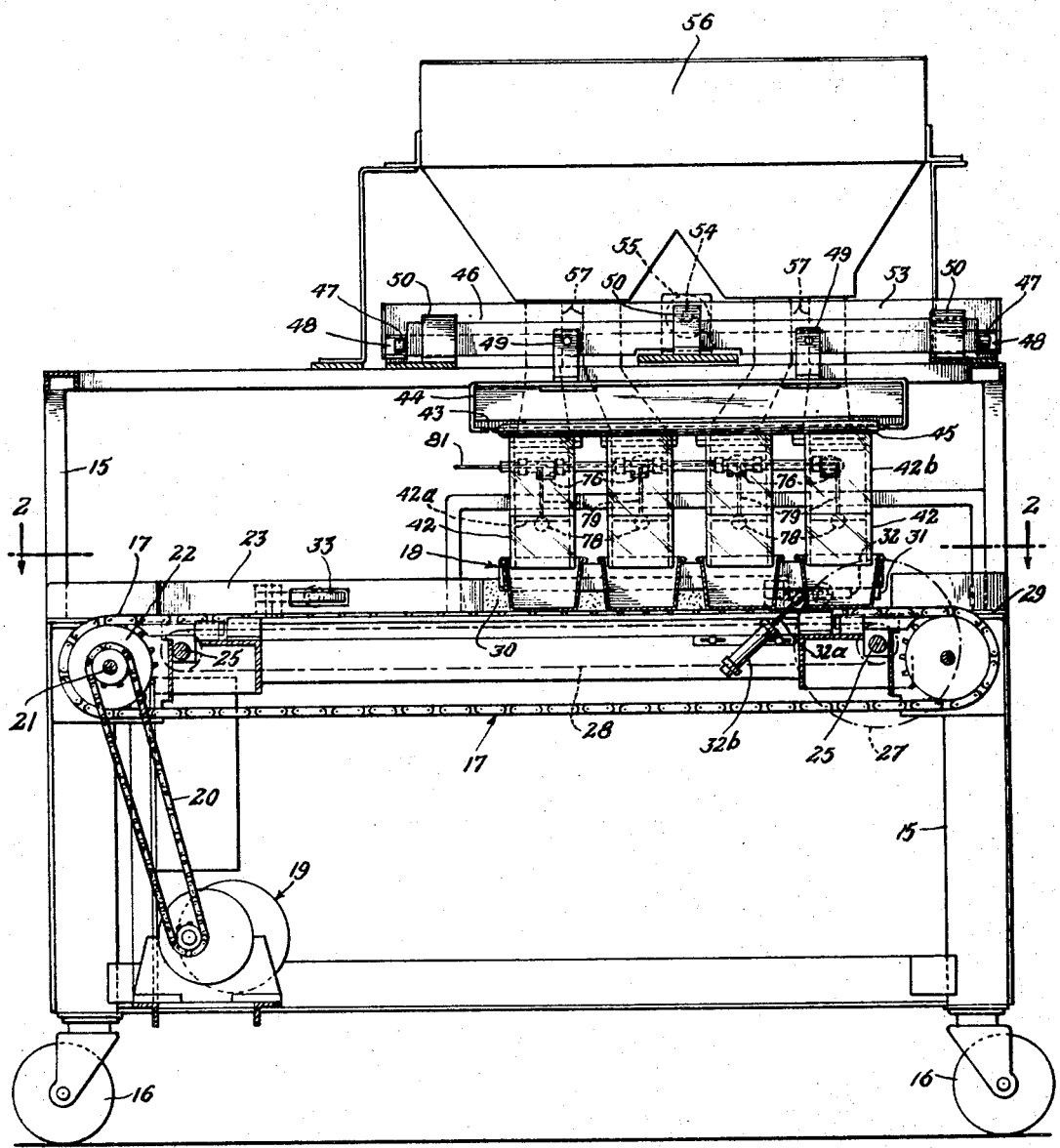
FIGURE 1 is a front sectional elevational view taken approximately on the line 1—1 of FIGURE 2.

Before beginning a detailed description of the machine in its presently preferred form as illustrated in the accompanying drawings I want to point out, as a matter of convenience in simplifying an understanding of the disclosure, that it consists of the following major elements:

A. A conveying mechanism for carrying the pans through the machine associated with which are certain control mechanisms for stopping the pans in proper position to receive the grease and subsequently freeing them to be discharged therefrom. At this point also it should be pointed out that the pans are arranged in groups known as a "strap of pans." This is quite customary in the baking industry and in the present disclosure it is contemplated that the pans will be handled in straps of four, although it is obvious that groupings of some other number of pans may equally well be employed by correspondingly altering the number of cooperating parts. I should also like to explain that the conveyor employed in the machine illustrated in the accompanying drawings is of sufficient length to accommodate two straps of four pans each. The first strap in line will, of course, be the first to be greased and the second strap will follow the first into the greasing position as the first strap is discharged.

Associated with the conveying mechanism is a counting device which senses the number of pans which pass a given point during the discharging operation. In the present instance the number would be four since four-pan straps are being employed. When the four pans of the strap which has been greased have passed the counting device, mechanism is actuated to arrest and hold the succeeding strap of pans so that it will remain in the proper position for the greasing operation.

B. A hood structure including a series of four hoods, i.e., a hood for each pan of the strap, and a supporting mechanism for the hoods by means of which they can be lowered into the pans for the greasing operation and withdrawn therefrom when the grease has been applied.

C. A feeding mechanism for delivering finely divided particles of a dust-like powder of a mold release agent into the hoods to be deposited from the hoods into the pans. Associated with this mechanism is a means for introducing air into the hoods approximately at the same time that the release agent is being delivered whereby to form a cloud of the finely divided particles.

D. An electrostatic field creating means within the hoods which imposes upon the interior walls of the hoods as well as upon the cloud of dust particles a polarity which is the same throughout and opposite to that which exists on the pan surfaces. The electrostatic field is created by employing a direct current and the polarity within the hoods and on the particles of the powder is negative while the polarity of the pans (which are grounded) is positive. This sets the stage for rapid and complete scavenging of the interior of the hoods because the negatively charged particles will be repelled from the hood walls and attracted to the positively charged pan walls.

At this point it should also be mentioned that the control mechanism includes means for delaying withdrawal of the hoods from the pans until such time as the powdered particles are completely discharged therefrom into the pans below. This is an important part of the control mechanism because it is essential to empty the hoods completely before they are withdrawn from the pans in order to avoid "overspray" or the dropping of dust to the outside of the pans. In other words, there must be a complete "decay" of the feed or scavenging of the hoods before the hoods are withdrawn from the pans. The way in which this is provided for will be described below.

The structural details of the preferred embodiment of my invention as illustrated in the accompanying drawings will now be described.

A. *The conveying mechanism*

A suitable supporting framework 15 is provided which is mounted upon casters 16 for convenience in moving the device from place to place as may be necessary. An endless chain type conveyor 17 moves the straps of pans through the machine from left to right as viewed in FIGURE 1 and in this figure a strap 18 of four pans is shown in position on the conveyor at the station where the greasing operation takes place, which is at the right of the machine as viewed in FIGURE 1. It will be noted that the conveyor 17 is of sufficient dimension longitudinally of the machine to accommodate a second strap of four pans to the left of the strap which is illustrated. This is for the sake of convenience in moving the pans through the machine, but it is obvious that the machine could be made longer if so desired. The conveyor 17 is driven by a motor and gear reduction means 19 through the medium of a chain 20 which turns the shaft 21 on which the chain sprockets 22 are mounted.

The pans are held in position upon the conveyor by means of the side guides 23 and 24, the guide 23 being a fixed guide and the guide 24 being a movable guide. The movable guide is provided in order to accommodate pans of different dimension and adjustment is accomplished by means of a pair of screw threaded rods 25 on each of which is mounted a nut 26 which in turn is secured to the movable guide 24. The adjusting rod 25 at one side is provided with a hand wheel 27 by means of which the adjusting rods 25 may be simultaneously rotated through the medium of an interconnecting chain 28. All of this mechanism is illustrated to best advantage in FIGURES 2 and 6.

A deck plate 29 extends along one side of the machine upon which plate certain of the parts are supported including the fixed pan guide 23. In the region of the pan greasing station this plate and the fixed guide are provided with electric insulating material shown by the stippling 30. This is for a purpose which will appear hereinafter.

A stop 31 is arranged to project into the path of pan movement to arrest each strap as it reaches the greasing station until such time as the greasing operation has been completed after which the stop is retracted in order to permit the strap to move out of the machine and make way for the succeeding strap. The manner in which this is accomplished will be more fully described below.

As the straps approach the greasing station a brake 32 slows the motion of the strap in order to provide for smooth operation as well as to check strap back lash or bounce. In addition, a holding piston 32a is provided which is positioned and actuated to project against the trailing side of a pan in order to hold the strap firmly in proper position for the greasing operation. (See FIGURES 2 and 12.)

An entrance brake 33 is also provided to retard the speed of the succeeding strap and this is brought into play as the machine goes through the operating cycle as will appear more fully hereinafter when the method of operation is summarized. The brakes 32 and 33 are set by air actuated pistons in the brake cylinders 34 and 35 and the piston 32a is also air actuated to perform its holding function when the brakes are set. (See particularly FIGURES 2 and 12.)

The pans are spaced slightly in the strap (in accordance with the practice of the art) and as a strap moves out of the machine each pan interrupts a light beam 36 coming from a light source 37, the light beam being sensed by an electric eye or photo-cell 38. (See FIGURES 6 and 12.) When the fourth pan passes the beam a counter 39 (FIGURE 12) initiates actuation of the piston 40 in the pan stop cylinder 41 to again move the pan stop 31 into the path of pan movement to arrest the succeeding strap in the dusting station.

B. *The hood structure*

A hood 42 is provided for each pan and in the embodiment illustrated four hoods will be required since the pans are in straps of four. These hoods 42 are made of an electrical insulating material such as Lucite or its dielectric equivalent so that the inner surfaces thereof can assume the same charge polarity as that which is placed upon the dust particles in the manner to be described more fully below. In this way the finely divided particles of the release agent (preferably a grease in powdered or dust-like form) are repelled by the electric charge upon the interior of the hood walls.

The hoods are secured to a hood slide plate 43 for ease of removal from the machine as an assembly, the plate being mounted in a hood carrier member 44. In order to facilitate sliding of the hood plate 43 into and out of its carrier member 44, it is provided at the front with a handle 45. This structure provides a means for quickly changing the hoods as may be necessary to accommodate pans of a different size or shape as is often necessary in the practice of automated baking. The structures involved are so constructed and arranged as to make the center line of the hoods coincide with the center line of the pans so that exact registry takes place when the hoods are lowered into the pans as will now be described.

At this point I wish to call attention to the fact that the open bottom of each hood is contoured to fit into the open top of the pan with which it cooperates so that it effectively covers the pan opening. I also prefer to make the hood so that it will project a distance into the pan when in its pan covering position. (See FIGURE 6.) The upper wall 42a of each hood is arranged at an angle so that it extends from a high point at the back of the machine to a low point at the front (see FIGURE 6). The dust is delivered into the hood just under the high point and the arrangement is such as to make the capacity of the hood such as to enclose approximately just that quantity of the dust which is needed for adequate depanning inasmuch as this reduces the interval required to clear or scavenge the hood of powder before it can be withdrawn after a dusting operation. In other words, the capacity of the hood must be sufficient to provide a cloud of lubricant particles which is at least adequate for the purpose but it should not be much in excess of that in order to minimize the time required to perform the greasing operation.

Each hood is secured to the slide plate 43 by hanger members 42b and 42c (FIGURE 6) which, preferably, are also made of Lucite or other suitable dielectric material.

Figure 5:
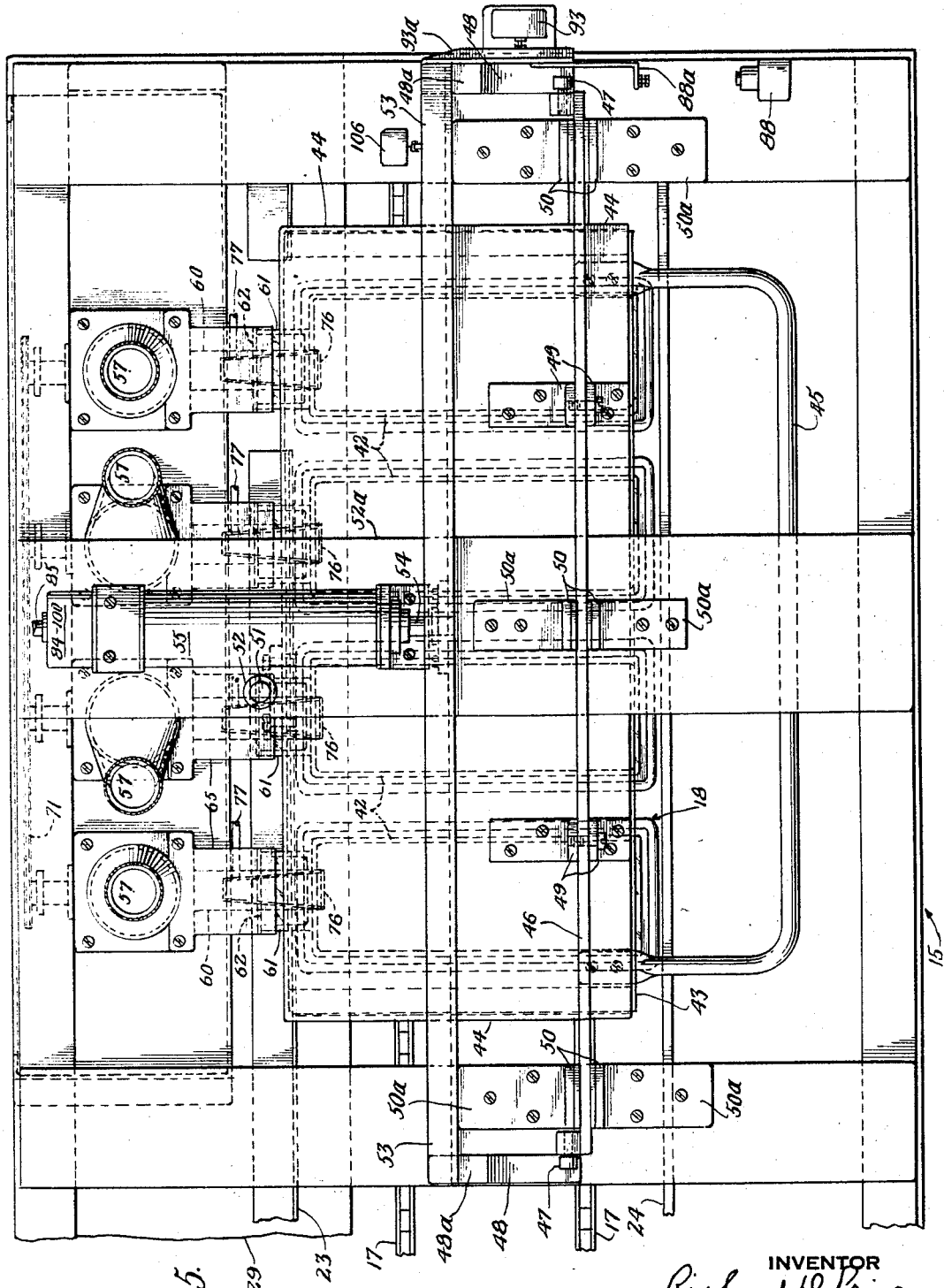
FIGURE 5 is a plan view of the mechanism I employ for raising and lowering the hoods and illustrating the feeders and air supply means as well as certain other structural details.

Above the hood carrier 44 is disposed a longitudinally extending hood lift bar 46 which bar spans the length of the strap of pans (FIGURE 5) and carries at each end a cam follower roller 47 which followers ride on the actuating cams 48, one at each end of the bar. The lift bar is secured to the hood carrier member 44 by suitable angle brackets 49 and the bar 46 is guided in its up and down motion by the spaced vertical guide members 50 of the angle plates 50a (FIGURE 5). Near the middle at the rear the hood carrier 44 has a guide post 51 which engages and slides up and down in a bearing member 52 secured on the frame member 52a. This prevents misalignment and possible binding of the hood carrier lift bar during the raising and lowering of the hoods.

A cam shift bar 53 is secured to the high portion 48a at the back of each cam 48 (FIGURES 5 and 6) by means of which bar the cams are moved toward and away from the cam follower rollers 47. This is accomplished by the piston rod 54 of the piston 87 in the air cylinder 55 (FIGURES 5 and 6). When the piston rod 54 moves the bar 53 and the cams 48 toward the followers 47 the hood lift bar 46 is raised and the hoods 42 are moved away and withdrawn from the pans and when the piston rod 54 moves the bar 53 and the cams 48 away from the followers 47 the hood lift bar 46 goes down and the hoods 42 are moved toward the pans.

C. *The lubricant feeding mechanism*

The release agent which I prefer to employ is one which can be prepared as a dust or powder at ordinary living temperatures and my machine makes use of such a powder and, therefore, is especially designed for the handling of a lubricant in powdered form. The structural details involved are best illustrated in FIGURES 5, 6, 9, 10 and 11, to which reference should be made in connection with the following description.

Above the dusting station is a suitable hopper 56 having four discharge throats 57—one for each hood with its cooperating pan. Below each discharge throat is a dust delivery mechanism consisting essentially of a screw conveyor 58 which moves the powder from the chamber 59 under the throat through the delivery tube 60 into the rear upper end of the hood 42. Surrounding the discharge end of this conveyor is a sealing mechanism which includes a Lucite or other dielectric box 61 with its open side facing away from the hood (see FIGURE 10). Between the base of this box and the opposed rear face 62 is a cushion of sponge rubber or like material 63 which serves to hold the box 61 in position to fit snugly against the rear wall of the hood 42 and its hanger member 42c.

Since the hood 42 must move upwardly and downwardly during operation of the machine I provide in its rear wall an enlarged aperture 64 through which the end of the tube 60 projects into the hood as clearly shown in FIGURE 10.

While I have indicated that the box 61 is made of Lucite, it is obvious, of course, that it could be made of some other suitable insulating or dielectric material, my purpose being to have the hoods 42, the hood hangers 42b and 42c and this associated structure composed of highly insulating material so that the hood and the incoming powder or dust can be charged in an electrostatic field in the manner to be described below. The wall 62 forms a part of and is supported by the bracket member 65 as is obvious from FIGURE 10.

In order to keep the powder from packing as it falls through the throats and into the box 59 I provide an agitator 66 mounted upon a shaft 67 which projects through the back wall of the box 59. On the end of the shaft 67 is an agitator arm 68 driven by an eccentric 69 on the rear of the screw conveyor 58, the eccentric being arranged to oscillate the agitator whenever the screw conveyor is in operation. The conveyor is driven through the drive sprocket 70 by means of a chain 71, motor 72, clutch 73 and driving pinion 74 (see FIGURE 9). In this figure it will be seen that the chain 71 is arranged to drive all of the screw conveyors 58 with their respective agitators simply by passing the chain under the rollers 75 located between each throat. In other words, since all four pans of a strap of four are to be dusted at the same time, I have designed the apparatus so that a single driving motor 72 will actuate all four feeding mechanisms in the manner just described.

Associated with each of the feeding mechanisms is an air supply nozzle 76 which delivers into the hood chamber immediately below the delivery point of the conveyor 58. There is a nozzle for each hood, of course, and an air supply line 77 delivers the air to each of the nozzles.

At this point I should like to explain that the air is not delivered at high pressure and velocity such, for example, as has been characteristic of the air used in the prior art to deliver liquid grease through a nozzle. This is unnecessary with my invention and the pressure and velocity of the air employed are only sufficient to create a cloud out of the incoming powder.

D. *The electrostatic field creating means*

In the upper portion of each hood I provide means for creating an electrostatic field within the hood. Through the top of each hood I introduce an electrode which terminates in the form of a small ball 78, the ball being supported at approximately the center of the interior of the hood by means of the supporting wire 79. A longitudinally extending wire 80 forms a part of this electrode so that there is ample electrode surface for creating the necessary electrostatic field throughout the interior of the hood. Direct current is employed and the negative side comes in through the wire 81 (see FIGURES 1 and 12). The pans are grounded and constitute the positive side of the circuit and the electrostatic potential which creates the field is always on.

The size of the ball 78, its location in the hood and the extent of the supplemental wire portion 80 of the electrode are all somewhat subject to empirical determination. For instance, the following factors would have a bearing, namely, the size of the pan to be covered, the volume of the hood which cooperates with the pan, the voltage to be used in creating the field, the mobility of the powder or other lubricant being used, the conveying velocity of the air stream issuing from the nozzles, etc. The point which should be kept in mind is that the electrostatic field should be created without developing too great an intensity in the field at any one point because too great an intensity will tend to blow away the deposited material rather than to help or aid in its deposition. On the other hand, if, for example, the ball employed is too large the field effect will be so much decreased that it really performs very little if any function. Any standard text in physics which discusses the principles involved in the charging of a surface intended to create an electrostatic field can be consulted if necessary. As a guide I have found that within the limits of my experimental determinations I believe that a ball electrode which is less than 3/8" in diameter would be too small for the purposes of this invention. I have further found that a ball greater than 7/8" in diameter is very likely to be too large in size. It is also obvious that a very small electrode located close to the surface to be covered might not function with complete satisfaction insofar as the present invention is concerned. However, even a small electrode, if it can be moved sufficiently far away frm the surface to be covered, might function quite adequately for the purposes of this invention.

*Summary of operation*

In the foregoing description certain of the parts involved in the control of the operation of my improved machine have not been referred to specifically because their nature and function can be better understood in connection with the following descripiton of the operation of the machine.

The straps of pans move into the machine from the left as viewed in FIGURE 1 and in this figure a strap of four pans is shown in the greasing station at which point it is held by the pan stop 31 and the piston 32a previously described. Associated with the pan stop is a trigger 82. When the pans engage the stop they also engage the trigger 82, which in turn actuates a switch 83 (FIGURES 2 and 12). Through suitable electrical wiring (not shown) actuation of the switch 83 moves an air control valve 84 through the medium of a solenoid 85 (FIGURE 12). Operating air coming in through the supply line 86 then flows through the valve 84 to the lower end of the cylinder 55 and under the piston 87 which moves the piston upwardly as viewed in the diagram of FIGURE 12 or to the right as viewed in FIGURE 6, which motion of the piston moves the cam shift bar 53 in the direction which draws the cams 48 away from the follower rollers 47. This permits the hood lift bar 46 to move downwardly so that the hoods 42 enter the tops of the pans (FIGURES 1 and 6).

Simultaneously with the start of downward movement of the hoods two additional events are initiated, namely, (1) the switch 88 is actuated to close a circuit to the solenoid 89 thereby opening the air valve 90 in order to permit air pressure to pass through the pipe 91 and a pressure regulator 92 to the nozzle air supply pipe 77 from which it flows to each of the nozzles 76; and (2) the switch 93 is actuated to close a circuit which engages the clutch 73 which starts the powder feeding conveyor 58 in the manner already described. These parts are arranged so that the air supply for the nozzles 76 will reach the nozzles slightly in advance of the time when the clutch is engaged to start the feed of the powder. In fact, the air supply is made available just as soon as the hoods start their motion toward the pans. In other words, the switch 88 is actuated slightly before the switch 93. In this way the air is ready to create the cloud of dust just as soon as the powder enters the hoods and when the powder flow is discontinued (as described hereinafter) the air supply is continued momentarily in order to be sure that all of the powder is formed into the desired cloud and also to clean up the ends of the powder supply openings. This prevents any small accumulations of powder at the ends of the powder supply tubes 60 which, otherwise, might fall down on the outside of the pans or on adjacent portions of the machine.

At this time also operating air reaches the cylinder 35 through the valve 84 and the line 84a which sets the brake 33 in order to retard the motion of the strap of pans which is next in line. At the same time piston 32a is projected against the trailing side of the first pan in the strap in order to hold the strap firmly in proper position for the greasing operation. This is accomplished by delivering air pressure from line 84a through line 32c to the cylinder 32b (see FIGURES 1, 2 and 12).

Air pressure coming in through the line 86 is also delivered to the valve mechanism 94 through the line 95. The valve 96 of this valve mechanism 94 is connected to the stop cylinder 41 through the line 97. Air also passes through valve 96 to the brake cylinder 34, the piston of which actuates the brake 32 (FIGURE 12). Valve 98 at the opposite end of the valve mechanism 94 is connected to the opposite end of the stop cylinder 41 by means of the air line 99. The valve 96 is operated by a solenoid 96a and the valve 98 by a solenoid 98a, and these two solenoids, of course, are under the control of the electric wiring system which is used to operate my machine but the details of which are not illustrated because they are simply applications of well known electrical principles.

Valve 100 which is opened by solenoid 100a controls the supply of air to the upper end of the cylinder 55 in order to move the piston 87 downwardly as viewed in FIGURE 12 (to the left in FIGURE 6). Such motion of the piston serves to move the cam bar 53 with the cams 48 in a direction toward the cam followers 47 which in turn raises the hood lift bar 46, thereby withdrawing the hoods from the pans.

The photo cell 38 which counts the pans as they pass the light source 37 drives a counter 39 (FIGURES 6 and 12). Since straps of four pans each are being dusted, on the count of "4" the counter 39 will energize the solenoid 96a to open the valve 96 and admit air therethrough and through the pipe 97 to the upper end of the stop cylinder 41 as already described. The stop 31 is thereupon moved to its pan-engaging position as shown in the diagram of FIGURE 12 and also in FIGURES 1 and 2. This is the condition which exists just after the last strap of pans has been dusted and discharged from the machine after the machine has been closed down following a period of use. At the same time movement of the pan stop to its outer or stop position also functions to move the switch 102 to reset the counter 39 so that it will be ready to count the four pans of the next strap to be discharged from the machine after the greasing operation. This is effected by the switch actuating arm 102a which is carried by and moves with the pan stop member 31 (FIGURES 2, 3 and 12). Incidentally, the stop 31 is also provided with a guide rod 103 (FIGURES 2 and 3). This guide rod is merely for the purpose of keeping the parts in alignment during actuation of the stop 31.

It should be noted also that the switch 88 is under the control of an actuating bar 88a carried by the hood lift bar 46 (FIGURES 5, 7 and 12), the switch 88 being closed to perform its function of closing the circuit to the solenoid 89 and opening the air supply valve 90 when the bar 46 moves away from the switch 88. This is the position indicated in FIGURES 5, 7 and 12.

It should further be noted that the switch 93 which controls the clutch for the feeding mechanism is similarly actuated by motion of the hood lift bar 46 in the direction which lowers the hoods into the pans. This is effected by the cam surface 93a at the side of the cam 48 shown at the right hand end of the diagram of FIGURE 12 and in FIGURES 5 and 7.

When a dusting operation is to be performed on pans of a given size and with dough of a certain kind as well as with various other conditions which have a bearing upon the amount of powder which it may be necessary to employ, the operator sets a timing mechanism 104 which determines the length of time that the clutch 73 will remain engaged and, therefore, the length of time that the powder will be delivered to the hoods thereby regulating the quantity delivered. The power supply for the timer is indicated at 105 in the diagram of FIGURE 12.

In connection with the feeding of the powder, it is important that the hoods are not removed from the pans following discontinuance of the feed until after a period of delay has occurred. This is known as the "decay" period and is for the purpose of clearing or completely scavenging the hoods of all powdered material prior to the time that they are withdrawn from the pans so as to avoid all possibility of having any of the powder fall down on the outside of the pans or on adjacent portions of the machine.

The "decay" period or the delay after the powder feed has been discontinued and before the hoods are withdrawn is subject to control by two factors, i.e.:

(1) If the conditions of operation are such as to require a relatively small amount of powder the operator may set the timer so that it completes the feed of the powder before the hoods reach their point of deepest penetration into the pans. However, even if the timer "times out" before the hoods reach their deepest point of penetration into the pans the "decay" period will not be initiated until the switch 106 (FIGURES 5, 7 and 12) is actuated by the cam shift bar 53 and this does not occur until the hoods reach their point of deepest penetration into the pans. In other words, both the timer 104 and the switch 106 are involved in signaling the beginning of the "decay" period and neither signal alone is sufficient to initiate this "decay" period.

(2) If the conditions of operation are such as to necessitate a relatively long period of powder feed the operator sets the timer 104 accordingly and, under these conditions, it might well happen that the duration of the period during which the powder is fed to the hoods may continue even after the hoods reach their point of deepest penetration into the pans. Under these circumstances, even though the switch 106 may have been actuated, the "decay" period following the powder feed cannot be initiated until the timer "times out" under the setting which the operator has given it.

From the foregoing it will be seen that the "decay" period before withdrawal of the hoods takes place will not be initiated until both of these factors or signals are completed whichever one occurs last. Following the occurrence of the last signal the timer will proceed with the initiation and completion of the "decay" period whereupon the valves 98 and 100 will be actuated to retract the hoods as well as the pan stop 31. The conveyor then moves the pans and discharges them from the machine. As the pans are discharged each pan of the strap will be counted and when the fourth pan passes the light beam the stop 31 will again be set to arrest the next strap of pans which enters the greasing position, as already described.

Attention is called to the fact that the duration of the feed cycle and consequently the quantity of powder delivered is determined by the time during which the clutch 73 is engaged. The motor 72 for driving the clutch may be operating constantly but the clutch is engaged only when a feeding operation is to be performed.

It might also be noted that, when the machine is in operation, the conveyor 17 is constantly operating and that the chains which constitute the conveyor merely slide past under the pans when the stop 31 is out and a dusting operation is under way. As soon as the greasing operation is performed and the stop 31 withdrawn, as above described, the chains 17 immediately move the straps of pans forward and discharge them from the machine.

As indicated above, I prefer to employ a release agent in the form of a dust or powder because in this form I find that I can better attain the objects and advantages of the invention than I can with a liquid type of grease. The melting point of the powder which I employ is preferably somewhere in the neighborhood of 160° F. although this may vary within reasonable limits. However, it should be noted that government regulations do not permit use of a grease which has a melting temperature so high that it will not carbonize in the heat of the ovens because such grease is considered to be inimical to health. In this connection mention might be made of some of the hydrogenated fats use of which is prohibited by the government.

One of the advantages which are incident to my invention is the fact that the powder, if desired, may be applied to the pans while they are hot as they always are after leaving the oven and following the removal of the bread. For instance, the location of my improved greasing unit in the pan-return conveyor line can be arranged so that the pans reach the greasing station while their temperature is somewhat above the temperature at which the powder melts. At the same time, it is important to avoid introducing the powder when the pans are too hot for the reason that this condition tends to develop a build-up of temperature within the hoods and this may lead to difficulty because it will adversely affect the deposition of the dust or powder. Obviously, if the powder begins to melt while suspended in the air within the hood it may deposit on the electrodes or otherwise cause difficulty. It will be understood, of course, that, whatever the temperature of the pans should be when the powder is deposited, will be determined by the melting temperature of the powder which is employed, and this may vary somewhat although I prefer, as indicated above, to employ a powder which melts at approximately 160° F. Therefore, if the powder is to melt when applied to a pan, the temperature of the pan should be at least slightly above the melting temperature of the powder, say in the neighborhood of 165° F. with the grease which I prefer to employ. This would be an approximate lower limit. Insofar as an upper limit of pan temperature is concerned, I have found by experience that this should be in the neighborhood of 185° F. Above this temperature difficulty may be encountered with fouling of the electrodes, as already mentioned, particularly if the ambient temperature in the bakery happens to be excessively high at the time. In short, there are quite a number of factors involved all of which must be appraised if an operation of this kind is to be undertaken. However, a little experimentation will quickly demonstrate the proper temperature at which the pans should be employed in relation to the melting temperature of the powder.

In line with the foregoing, another factor has to be considered, namely, variations in the size of the pans which are being handled at the time. Large pans, of course, having a greater mass will take a greater time to cool. On the other hand, the larger the pan the larger the floor or bottom of the pan, and since the pan is resting upon a heat-conducting surface heat will be more rapidly dissipated through the large floor area of such a pan than it would be through a smaller area.

It is obvious that when a grease powder which melts at 160° F. contacts pans which are heated to the temperatures mentioned the powder will immediately liquefy and spread on the surface. Then as the pans cool the liquid will harden in situ and this makes it possible to prepare large numbers of pans in adavnce of the time that they are to be used in a baking operation. They can be stored with the grease in place and drawn upon as needed to meet the capacity of the ovens.

On the other hand, attention should be directed to the fact that my invention contemplates applying the powder to the pans when they are cool, that is, to pans whose temperature may be near the ambient temperatures encountered in the bakery. Sufficient powder will adhere even to such relatively cool pans to accomplish the needed greasing and enable proper separation of the bread from the pans after the baking has been completed.

Insofar as the creation of the electrostatic field is concerned, I might give as an example that if the electrode system in the hoods is charged to a negative potential in excess of minus 10,000 volts D.C. the pans and the machine frame on which they are supported may be considered the ground return system for this electrostatic voltage, in which event the electrode system appears to have a negative potential of at least minus 10 kilovolts D.C. (direct current with respect to ground). The foregoing, however, is merely illustrative and has not been presented as in any way limiting the principle involved.

One of the advantages of the use of powdered grease in the manner described is that relatively large areas can be covered with a relatively thin film of material which at the same time is adequate for the depanning operation. This enables considerable saving in the quantity of grease which is employed over what is possible with the use of liquid grease. Furthermore, the natural dispersion of the powder material on the hot surface is enhanced by the wetting condition which results when the powder goes into its liquid phase as it may on a hot pan or as it will in the oven. This causes it to spread by capillary action so that extremely thin, while completely adequate, films are possible.

It should also be emphasized that the use of enclosures or hoods in the manner described herein provides a positive means for confining the grease to a predetermined pattern, namely, to the interior surfaces of the pans, which pattern is completely independent of the surrounding ambient conditions, i.e., air currents and drafts cannot affect the distribution of the powder.

The use of a dielectric material from which to construct the hoods and associated parts permits the inner surfaces of the hoods to be charged at the same polarity as that of the charging electrodes and as a result the powdered material is repelled by the walls of the enclosure and this provides for a high dispersion efficiency. Furthermore, the charge on the inside of the hoods also prevents the accumulation of a particulate mass on the inner walls of the hoods thereby assuring that no residual mass will be present to drop off and cause undesired deposits on the pan edges or their outer walls or on adjacent parts of the machine.

In connection with the electrodes which create the electrostatic field I would point out that the use of the ancillary wire electrodes which run longitudinally toward the ends of the hoods helps to create and maintain a uniform charge on the interior surfaces of the hood. Furthermore, in the case of the electrode which is disposed toward the end of the hood opposite to the powder feeding mechanism, it will be noticed that it is angularly positioned with respect to the vertical surface of the pan so that turbulence is created in this area and efficient deposition occurs on the vertical end of the pan. At the same time the electrode which is positioned at the other end, namely close to the powder feeding mechanism, serves a similar function but has the added function of overcoming the electrostatic shield effect which is introduced by the protrusion of the end of the feeder and of the air nozzle into the hood enclosure.

It is also extremely useful in this invention to utilize ancillary electrodes which do not have a point type of discharge. In other words, if the ends are rounded or turned over as shown at 107 in FIGURE 6 it will aid considerably in avoiding partially uncoated pan ends.

Insofar as the vertical placement of the electrode system is concerned it can be said that this is not unduly critical although it should be sufficiently high with respect to the pans to avoid the formation of conductive ionization paths, i.e., conditions of arc formation should be avoided for best results.

The geometric design of the hoods is of some importance to the attainment of the best possible type of operation. For instance, the enclosed volume must be kept to a minimum or as close to a minimum as possible so that at the end of the feeding cycle and deposition upon the pan walls there should not be a large residual volume of unprecipitated material. Such a large volume of unprecipitated material would have to be scavenged before the hoods are withdrawn from the pans. It is obvious, of course, that if the volume of powder which is enclosed by the hoods is maintained at a minimum it is possible to use a very short "decay" period, which makes it possible to operate with great rapidity.

Another useful feature of my machine resides in the fact that the discharge end of the feeder means is located at a point directly adjacent the point of introduction through the hood wall so that no residual particulate mass can be built up between an earlier valving point and the actual dispersing point. This avoids any possibility of drip or afterflow which, of course, would lead to the possibility of some of the powder falling down on the outside of the pans or adjacent portions of the machine after the hoods are removed and the pans go forward for discharge from the machine. In other words, the material comes in and immediately encounters the air from the nozzle 76 so that it is converted into a cloud without any measurable delay.

The sealing mechanism where the powdered material comes in is important and the compressible sponge rubber acts to keep the parts snugly together so that the required vertical motion of the hood can take place without the release of powder to a point outside of the hoods.

Another feature to which I wish to call specific attention is the use of the insulation 30 on the fixed pan guide and on the deck plate 29. This insulation is an aid in confining the electrostatic field to the interior of the hoods when there are no pans in position in the greasing stage, thus preventing all possibility of depositing any of the lubricating material on the deck or the guide. Of course, under ideal operating conditions there is very little if any powder remaining in the hoods after deposition has taken place and the hoods have been withdrawn so that the insulation is more in the nature of insurance than it is of real necessity.

Still another advantage which is inherent to my invention resides in the fact that even after the feed of lubricant has been discontinued the air from the cloud forming nozzle continues to flow for a fraction of a second and effectively cleans up both the end of the feeder and the nozzle itself, and this tends to avoid all possibility of afterflow of unaerated lubricating powder.

I claim:

1. A machine for applying powdered lubricant to the inner surfaces of baking pans, comprising a hood adapted to cover the pan opening, hood mounting means constructed and arranged to move the hood toward and away from the pan, a lubricant supply means adapted to deliver lubricant into the hood, means for stopping the supply and scavenging the hood before it is moved away from the pan, and means for creating an electrostatic field within the hood having a charge of one polarity and opposite to that on the pan, the pan being grounded, whereby the lubricant is carried to the pan walls and the hood is scavenged.

2. A machine according to claim 1 wherein the electrostatic field creating means includes an electrode in the hood.

3. A machine according to claim 1 wherein the hood mounting means includes a removable slide to which the hood is attached whereby pans of different sizes may be handled by the machine upon changing the slide and its hood to correspond thereto.

4. A machine for applying powdered lubricant to the inner surfaces of baking pans or the like, comprising conveying mechanism for carrying the pans through the machine, a hood shaped to fit the contour of the pan opening, hood mounting means constructed and arranged to move the hood toward and away from the pan, a lubricant powder supply conduit adapted to deliver into the hood, means for starting the supply of lubricant powder when the hood is moved toward the pan, means for stopping the supply as desired, and means momentarily delaying movement of the hood away from the pan following discontinuance of the supply.

5. A machine according to claim 4 in which a low velocity air supply is provided and arranged to cause the supplied powder to form a cloud.

6. A machine according to claim 4 wherein the hood is constructed of dielectric material and wherein means are provided for imposing upon the supplied lubricant powder and upon the inner walls of the hood an electrostatic charge of one polarity and opposite to that of the pan.

7. A machine according to claim 4 in which a low velocity air supply is provided and arranged to cause the supplied lubricant powder to form a cloud, together with means for continuing the supply of air momentarily following discontinuance of the powder supply.

8. A machine for applying powdered lubricant to the inner surfaces of baking pans, comprising a hood adapted to project into a pan, hood mounting means constructed and arranged to move the hood into and withdraw it from the pan, a lubricant supply conduit adapted to deliver lubricant into the hood, means for starting and stopping the supply of lubricant, an adjustable timing device for varying the length of the period of lubricant supply, a powder delivery control mechanism adapted to be actuated by the hood mounting means, and means for initiating withdrawal of the hood only after both the timing device has completed its cycle of operation and after the hood has reached its point of deepest penetration into the pan.

9. A machine for applying powdered lubricant to the inner surfaces of a baking pan, comprising conveying mechanism for carrying the pan through the machine, a hood adapted to cover the pan, hood mounting means constructed and arranged to move the hood toward and away from the pan, a lubricant powder supply means adapted to deliver into the hood, means for delivering air into the hood to cause the supplied powder to form a cloud, means for stopping and holding the pan in position to receive the powder, means providing for actuation of said air supply means slightly before action of the powder supply, means for discontinuing the powder supply, means for discontinuing the air supply slightly after the powder supply has been discontinued, means for initiating movement of the hood away from the pan following discontinuance of the powder supply, and means for withdrawing the stopping means and releasing the pan for discharge from the machine by the conveying mechanism after the hood has been moved away from the pan.

10. A machine according to claim 9 which includes means for creating an electrostatic field within the hood having a charge of one polarity and opposite to that of the pan.

11. A machine according to claim 9 wherein a braking mechanism is provided for retarding the motion of the succeeding pan entering the machine as the powdered pan is discharged.

12. A machine according to claim 9 wherein a plurality of pans are handled as a strap with a hood and associated parts for each and wherein means for counting the pans as the strap is discharged are provided together with trigger mechanism constructed to effect resetting of the stopping and holding means when the pan count of each strap is completed.

References Cited
UNITED STATES PATENTS

| | | | |
|---|---|---|---|
| 2,509,448 | 5/1950 | Ransburg et al. | 118—622 X |
| 3,065,106 | 11/1962 | Rhodes | 118—622 X |
| 3,077,857 | 2/1963 | Widner | 118—622 X |
| 3,291,631 | 12/1966 | Smith | 118—308 X |

CHARLES A. WILLMUTH, *Primary Examiner.*

J. P. McINTOSH, *Assistant Examiner.*